US006306474B1

(12) United States Patent
Yoshioka et al.

(10) Patent No.: US 6,306,474 B1
(45) Date of Patent: Oct. 23, 2001

(54) HYBRID FIBER-REINFORCED PLASTIC

(75) Inventors: Kenichi Yoshioka; Takehiko Hirose; Kenichi Noguchi, all of Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/202,827

(22) PCT Filed: Apr. 22, 1998

(86) PCT No.: PCT/JP98/01851

§ 371 Date: Dec. 22, 1998

§ 102(e) Date: Dec. 22, 1998

(87) PCT Pub. No.: WO98/47693

PCT Pub. Date: Oct. 29, 1998

(30) Foreign Application Priority Data

Apr. 22, 1997 (JP) .................................................. 9-104213

(51) Int. Cl.[7] .................................................. B32B 27/04
(52) U.S. Cl. .................. 428/36.4; 428/298.1; 428/299.1; 428/299.7; 428/300.4
(58) Field of Search .............................. 428/36.4, 298.1, 428/299.1, 299.7, 300.4

(56) References Cited

U.S. PATENT DOCUMENTS 5,512,119   4/1996   Takezawa et al. .

FOREIGN PATENT DOCUMENTS

| 0062973 | 10/1982 | (EP) . |
| 0436391 | 7/1991 | (EP) . |
| 3199011 | 11/1983 | (JP) . |
| 58205755 | 11/1983 | (JP) . |
| 342242 | 2/1991 | (JP) . |
| 3113035 | 5/1991 | (JP) . |

Primary Examiner—Elizabeth M. Cole
(74) Attorney, Agent, or Firm—Birch, Stewart, Kolasch & Birch, LLP

(57) ABSTRACT

The present invention relates to a carbon fiber reinforced plastic member provided with high-elongation fiber bundle regions, which are uni-directionally aligned and separately disposed within the plastic member. The plastic member provides a carbon fiber reinforced plastic of lightweight, high strength and high modulus that is safe. Even if it breaks, it shows little scatter of fragments or exposure of dangerous fracture surfaces. Preferably, the high-elongation fiber at break has an elongation exceeding about 10%.

15 Claims, 1 Drawing Sheet

HYBRID FIBER-REINFORCED PLASTIC

This application is the national phase under 35 U.S.C. §371 of prior PCT International Application No. PCT/JP98/01851 which has an International filing date of Apr. 22, 1998 which designated the United States of America.

TECHNICAL FIELD

The present invention relates to reinforced plastic members employing carbon fibre and high-elongation organic fibre; in particular, it relates to reinforced plastic members which, while being of light weight and high strength, are comparatively cheap and at the time of failure do not readily split apart or exhibit a dangerous mode of rupture and so are very safe when used for ski-poles, golf club shafts, bicycle frames, wheelchairs and the like.

TECHNICAL BACKGROUND

Carbon fibre reinforced plastic members, with their outstanding characteristics of light weight, high strength and high modulus, are widely used for sporting goods and industrial structural materials.

By using carbon fibre reinforced plastics it is possible to reduce the weight of members thereof in comparison to conventional materials, but carbon fibre reinforced plastics can exhibit a dangerous form of failure differing from that of conventional materials such as metals and, because of this, applications are either restricted or it may not be possible to fully manifest the outstanding characteristics of these materials in their applications.

For example, reducing the weight of ski-poles is of considerable significance but it is necessary that, should they break during use, the fracture surface presents no danger to the body. When conventional aluminium alloy ski-poles undergo failure, they mostly merely fold-over without breaking apart, but carbon fibre reinforced ski-poles which have become increasing popular in recent years comparatively frequently break apart when undergoing failure.

Furthermore, racing bicycle frames are another application where there is a strong demand for a reduction in weight and carbon fibre reinforced plastics are being used for this purpose. However, it is dangerous if, when the frame undergoes failure in an accident, it breaks apart and so it is desirable that even when undergoing failure that it does not break apart but remains intact.

Again, carbon fibre reinforced plastics are often used in order to reduce the weight of golf club shafts, but when the ground or a tree, etc, is struck as a result of a miss-shot, the situation may arise where the shaft snaps and the club head is sent flying. This is likely to be a particular problem when used by technically inexperienced children, and it is desirable that even when undergoing failure that it does not break apart but remains intact.

There are also many other applications such as wheelchairs and badminton racquet shafts where a reduction in weight is desired and where it is also desired that those members with a strong possibility of coming into contact with the human body do not split apart should failure occur.

To deal with this problem in the case of ski-poles for example, a combination of glass fibre fabric or metal fibres with the carbon fibre reinforced plastic has been employed. However, such methods require the use of quite a large amount of glass fibre or metal fibre, so that the weight of the ski-pole increases or its rigidity is lowered and it becomes more difficult to use. Additionally, as well as high performance metal fibres being generally expensive, fabrication processability is poor and there is usually an increase in the cost of the ski-pole.

Again, in the case of bicycle frames and handle bars too, as described in Japanese Unexamined Patent Publication Nos 5-69874 and 5-147569, the method of incorporating, as reinforcing fibre, metal fibre and some fibre other than metal fibre for preventing breaking apart is also known. However, in such cases the problem also frequently arises or increased weight or raised cost.

The objective of the present invention lies in resolving the aforesaid problem of the prior-art and offering, comparatively cheaply, fibre reinforced plastic members which, while retaining the outstanding characteristics of carbon fibre reinforced plastics of light weight and high strength, do not readily break apart at the time of failure or exhibit a dangerous failure mode, and so may be used safely as ski poles, bicycle frames, golf club shafts and the like.

DISCLOSURE OF THE INVENTION

In order to realise the aforesaid objective, the present invention has the following constitution. Specifically, the present invention relates to a hybrid type fibre reinforced plastic which has carbon fibre and high elongation organic fibre.

Again, the present invention relates to a resin-impregnated hybrid prepreg which is characterized in that it contains carbon fibre and high elongation organic fibre.

In a preferred embodiment, the high elongation organic fibre is dispersed, arranged in bundle form, with the percentage by volume thereof being 10 to 30% in terms of the carbon fibre and the elongation at break thereof being at least 10%.

Figure 1:
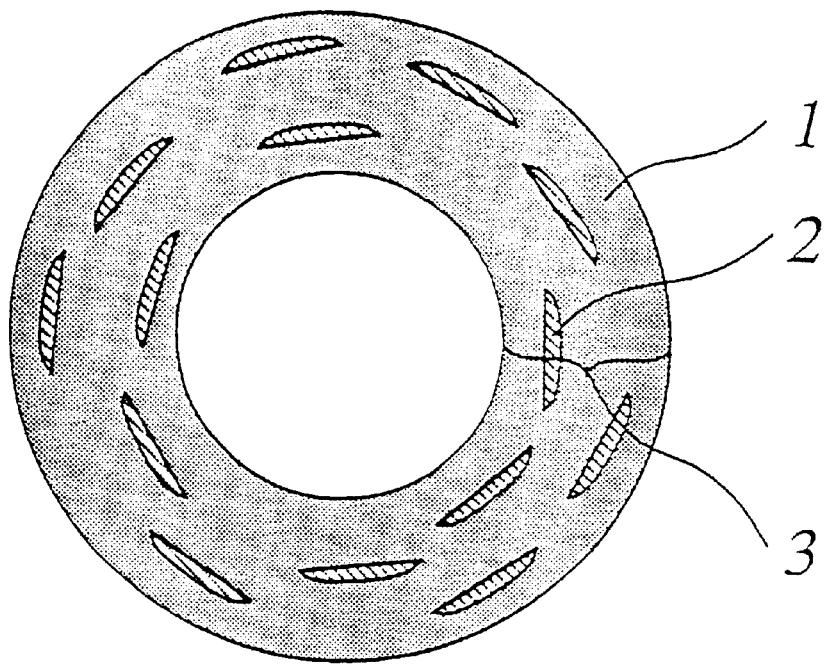
FIG. 1 is an example of the cross-section of a member relating to the present invention.

1 region having carbon fibre
2 region having high elongation organic fibre
3 hybrid region
4 non-hybrid region

OPTIMUM FORM FOR PRACTISING THE INVENTION

The hybrid type fibre reinforced plastic relating to the present invention is used for goods where there is a fear of dangerous breakdown, for example it is used for all of a ski pole or golf club shaft, etc or for a member thereof. Where required, it may also be one portion of a fibre reinforced plastic.

The carbon fibre employed may be of any kind, such as polyacrylonitrile-based or pitch-based carbon fibre, including so-called graphite fibre, but a polyacrylonitrile-based carbon fibre with high tensile strength is preferred. With regard to the form thereof, there can be used twisted yarn, de-twisted yarn or non-twisted yarn, but de-twisted yarn or non-twisted yarn is preferred in terms of the balance between the member fabrication properties and strength.

The high elongation organic fibre should have a tensile elongation at break higher than that of glass fibre which is the typical inorganic fibre. Specific examples are polyamide fibre, polyester fibre, polyvinyl alcohol fibre, polyacrylonitrile fibre and polyurethane fibre. Of these, polyester fibre and polyamide fibre are preferred in that, as well as having a high tensile elongation elongation at break, such fibre is comparatively cheap and is outstanding in its handling properties. At the time of member failure, that is to say when the carbon fibre breaks, the high elongation organic fibre does not break at the same time, and by sufficient absorption of the accumulated strain energy, the splitting apart of the member and exposure of a dangerous fracture surface are avoided. Consequently, the appropriate high elongation organic fibre is one with a high tensile strength and high tensile elongation at break, and it is preferred that it has a high residual energy absorption level following, for example, 5% tensile strain. The tensile strength is preferably at least 0.5 N/tex and the tensile elongation at break, which is especially important, is preferably from 10 to 200%, with from 15 to 50% further preferred.

Where the carbon fibre and the high elongation organic fibre are uni-directionally aligned, the effects are striking, but there is no need, where there are production limitations or the like, for the alignment necessarily to match perfectly. However, it is preferred that the difference in direction of the two be within 3°.

As well as the carbon fibre and the high elongation organic fibre, there may also be included a third fibre within a range such that the effects of the invention are not lost. In terms of achieving a balance between the mechanical properties of the member and production stability, the fibre volume fraction, containing all fibre, preferably within the range 40 to 80% and still more preferably within the range 50 to 70%.

As the matrix resin, there can be used various types of thermosetting resin and thermoplastic resin, such as epoxy resins, phenolic resins, polyester resins andvinyl ester resins. Of these, epoxy resins are preferred in that fabrication is easy and their properties excellent. Again, for the purposes of adding various properties and functions, particulate and fibre-form materials may be included in the matrix resin within a range such that the effects of the invention are not lost.

The alignment direction of the carbon fibre and the high elongation organic fibre is preferably parallel to the principal axis of the member. The principal axis of the member corresponds to the axis which most readily undergoes failure, and in the case of a sheet-form, rod-form or tubular member it is the axis in the longitudinal direction. Where the fibre is aligned with the principal axis of the member, it is possible to prevent more effectively the occurrence of splitting apart along with failure of the member and the exposure of a fracture surface.

There are no particular restrictions as to the arrangement of the carbon fibre and the high elongation organic fibre in the hybrid regions, but in order to prevent overall failure of the member it is preferred that, in the cross-section perpendicular to the alignment direction of the fibre, high elongation organic fibre bundles are dispersed and arranged within regions having the carbon fibre, in a so-called 'sea/islands' structure. In the case of a tubular member, this structure preferably has a cross-section as shown for example in FIG. 1, where the high elongation organic fibre bundle regions 2 are dispersed and arranged within the region 1 with the carbon fibre. Now, in the figure, 3 denotes the hybrid region. In this way, it is possible to prevent simultaneous rupture of the carbon fibre and high elongation organic fibre, and it is also possible to retain uniformity of the properties as a whole. Again, at the same time, it is also possible to suppress the effects, on the properties of the member, in cases where debonding occurs between the region with the carbon fibre and the high elongation organic fibre bundle regions. With this kind of arrangement, it is preferred that the mutual separation between the regions of high elongation organic fibre does not exceed 5 mm in the case of members of the size of ski poles, golf club shafts and bicycle frames. Again, by using high elongation organic fibre which has been treated with a release agent or which is in a non-adhered state, it is also possible to prevent still more effectively overall failure of the member.

Furthermore, the percentage by volume of high elongation organic fibre in terms of the carbon fibre preferably does not exceed 30%. If it lies above this range, strength and rigidity tend to be lowered. On the other hand in a case like that of a golf club shaft, which is relatively light and where there are relatively few hybrid regions, it is more preferably at least 10%.

Figure 2:
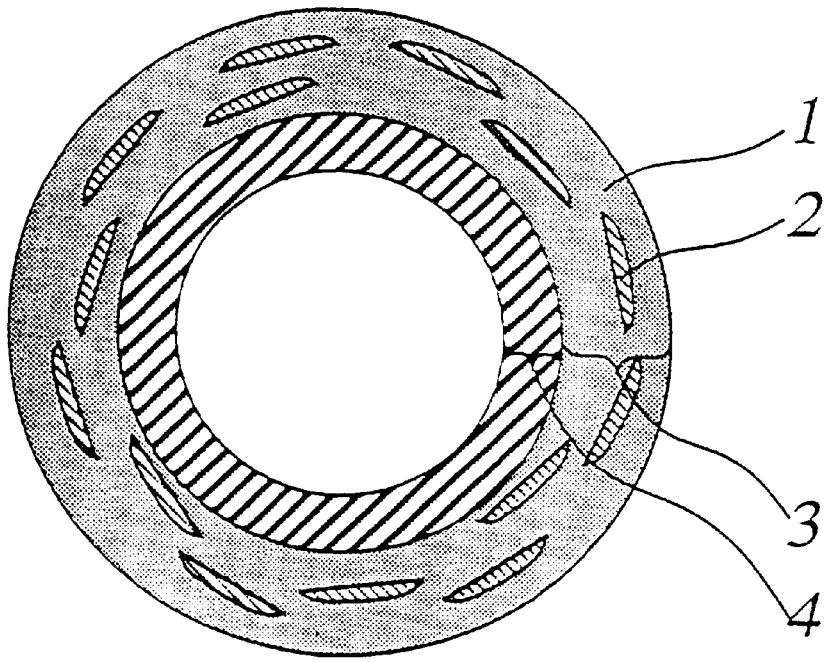
FIG. 2 is another example of the cross-section of a member relating to the present invention.

The hybrid type fibre reinforced plastic of the present invention can, where required, be used in combination with various kinds of fibre reinforced plastic or metal, etc. For example, FIG. 2 shows a tubular material with a cross-section in which there is a non-hybrid region 4 on the inside. Preferably, of the fibre reinforced plastic portion having carbon fibre aligned in parallel to the principal axis of the member, a portion exceeding 50 vol % and more preferably exceeding 80 vol % should be a hybrid region.

The member of the present invention can have any shape such as a sheet form or rod form, depending on the particular application and structure, but a tubular shape is preferred in order to make the most of the characteristics of the carbon fibre reinforced plastic and to enhance the effects of the invention. Tubular shape means a shape of substantially circular cross-section which is hollow or which has a different material such as a foam material in the interior and, where required, the principal axis may be curved or a taper can be provided.

Moreover, a structure having high-elongation fibre covering carbon fibre bundles also prevents splitting apart and the scatter of fragments at the time of failure of the member and is effective in enhancing safety. With this structure, the high elongation organic fibre need not be aligned in the same direction as the carbon fibre, and the covering may be carried out for example with the high elongation organic fibre running around the circumference of the carbon fibre bundle in helical fashion. Now, in the cross-section perpendicular to the alignment direction of the carbon fibre, it is preferred that a region exceeding 40% of the respective peripheries of the carbon fibre bundles be covered with high elongation carbon fibre. In the case of this structure too, the form of the member is preferably tubular.

Ski poles comprising a tubular member of the present invention do not produce an exposed fracture surface when they break during use, and there is little possibility of causing harm to the body, so they have markedly higher safety when compared to conventional carbon fibre reinforced plastic ski poles. It is possible to provide ski poles which do not undergo splitting failure due to a compressive buckling force in the ski pole buckling point test specified in JIS S7026. In regard to the light weight, strength and appropriate rigidity which are the important characteristics of a ski pole, there is very little difference when compared to conventional carbon fibre reinforced plastic ski poles, and practically no difference can be felt at the time of use.

Besides ski poles, the member of the present invention is ideal for use in other applications where a reduction in weight is desired and where it is desired that the failure mode, should failure occur, pose little danger to the body, such as golf club shafts, bicycle frames, wheelchair frames, hockey sticks, badminton rackets, kendo fencing equipment, fishing rods and walking aids.

The hybrid type fibre reinforced plastic of the present invention can be fabricated using a hybrid prepreg comprising uni-directionally aligned carbon fibre and high elongation organic fibre impregnated with resin. The hybrid prepreg is obtained by a method such as producing a uni-directionally aligned sheet-form of the carbon fibre and high elongation organic fibre, then impregnating this with a resin prior to hardening, or alternatively affixing the high elongation organic fibre to the surface of a known carbon fibre prepreg. For fully manifesting the performance of the fibre reinforced plastic member of the present invention, it will be appropriate if the volume fraction of high elongation organic fibre in terms of the carbon fibre in the hybrid prepreg does not exceed 50%. This hybrid prepreg can also be used by, for example, affixing a separate prepreg comprising aligned carbon fibre in sheet form, and as the fibre in the affixed prepreg there may be used fibre of different strength or modulus, or there may be used different fibre such as glass fibre or aramid fibre. Again, it is possible to adjust the high elongation fibre content by adjusting the amount of affixed prepreg.

With regard to the aligned high elongation organic fibre, by arranging this at intervals in the direction perpendicular to the fibre direction, when the fibre reinforced plastic member of the present invention is fabricated, regions with high elongation organic fibre are dispersed and arranged and can be employed advantageously. Again, as stated above, it is better if the mutual apacing between high elongation organic fibre regions within the member is not too great, so it will appropriate in the present invention if the spacing between high elongation organic fibre regions, that is to say the 'pitch', does not exceed 50 mm. Moreover, where it does not exceed 30 mm, and still more preferably where it does not exceed 20 mm, the capacity of the hybrid type fibre reinforced plastic can be fully manifested.

The member of the present invention can be produced by a process practically no different from that of conventional carbon fibre reinforced plastic members, by fabrication using a hybrid prepreg comprising uni-directionally aligned carbon fibre and high elongation organic fibre impregnated with resin. Consequently, the production costs are practically no different from hitherto.

Below, explanation is given by providing some examples and comparative examples. An outline of the results obtained in these is shown in Table 1 towards the end.

EXAMPLE 1

Carbon fibre prepreg A prepreg weight per unit area 320 g/m$^2$, fibre content 67 wt %) was prepared by impregnating, with B-stage epoxy, PAN-based carbon fibre bundles (number of filaments 12000, thickness 804 tex, elongation 2.1%, tensile strength 4900 MPa, and tensile modulus 230 GPa) which had been aligned and laid out in the form of a sheet.

Identical PAN-based carbon fibre bundles and nylon 66 fibre bundles (number of filaments 306, thickness 210 tex, elongation 19.5%, tensile strength 0.93 N/tex) were uni-directionally aligned and laid out in the form of a sheet. The pitch between the nylon 66 bundles at this time was made 30 mm. Hybrid prepreg B (prepreg weight per unit area 315 g/m$^2$, fibre content 68 wt %) was prepared by impregnating this with B-stage epoxy resin. The percentage by volume of nylon 66 in terms of the carbon fibre in hybrid prepreg B was 5%.

Firstly, carbon fibre prepreg A was wrapped around a release agent-treated stainless steel mandrel of outer diameter 8 mm on the narrower diameter side and 11 mm on the wider diameter side, and of length 1400 mm, in such a way that the fibre direction was perpendicular to the principal axis of the mandrel, then the hybrid prepreg B was wrapped around in such a way that fibre direction was parallel to the principal axis of the mandrel, after which, by the method normally conducted by those skilled in the art, wrapping tape was wound around, and curing carried out in an electric oven, after which the mandrel was removed, the outer diameter polished and the two ends cut off, to produce a shaft for a ski pole of length 1250 mm.

When the end faces of this shaft were polished and observed with an optical microscope, it was seen that the hybrid region on the shaft exterior where the fibre direction was parallel to the principal axis had a sea/islands structure in which the regions having nylon 66 were dispersed in the region having carbon fibre. The wall thickness of the shaft was 1.5 mm.

When this shaft was subjected to a buckling point test based on JIS S7026, the maximum load was 690 N. While there was some scatter of small fragments at the time of failure, there was no breaking apart of the shaft.

EXAMPLE 2

PAN-based carbon fibre bundles and nylon 66 fibre bundles identical to those used in Example 1 were uni-directionally aligned and laid out in the form of a sheet. The pitch between the nylon 66 fibre bundles at this time was made 15 mm. Hybrid prepreg C (prepreg weight per unit area 311 g/m$^2$, fibre content 68 wt %) was prepared by impregnating this with B-stage epoxy resin. The percentage by volume of the nylon 66 fibre in terms of the carbon fibre in hybrid prepreg C was 10%.

A shaft for a ski pole was produced in the same way as in Example 1 except that there was used hybrid prepreg C instead of hybrid prepreg B.

When the end faces of this shaft were polished and observed with an optical microscope, it was seen that the hybrid region on the shaft exterior where the fibre direction was parallel to the principal axis had a sea/islands structure in which regions having nylon 66 fibre were dispersed in the region having carbon fibre. The wall thickness of the shaft was 1.5 mm.

When this shaft was subjected to a buckling point test based on JIS S7026, the maximum load was 688 N. There was no scattering of fragments at the time of failure and there was no breaking apart of the shaft.

EXAMPLE 3

PAN -based carbon fibre bundles and nylon 66 fibre bundles identical to those used in Example 1 were uni-directionally aligned and laid out in the form of a sheet. The pitch between the nylon 66 fibre bundles at this time was made 5 mm. Hybrid prepreg D (prepreg weight per unit area 296 g/m$^2$, fibre content 66 wt %) was prepared by impregnating this with B-stage epoxy resin. The percentage by volume of the nylon 66 fibre in terms of the carbon fibre in this hybrid prepreg D was 29%.

A shaft for a ski pole was produced in the same way as in Example 1 except that there was used hybrid prepreg D instead of hybrid prepreg B.

When the end faces of this shaft were polished and observed with an optical microscope, it was seen that the hybrid region on the shaft exterior where the fibre direction was parallel to the principal axis had a sea/islands structure in which regions having nylon 66 fibre were dispersed in the region having carbon fibre. The wall thickness of the shaft was 1.5 mm.

When this shaft was subjected to a buckling point test based on JIS S7026, the maximum load was 620 N. There was no scatter of broken fragments at the time of failure and there was no breaking apart of the shaft.

EXAMPLE 4

PAN-based carbon fibre bundles identical to those used in Example 1 and polyester fibre bundles (number of filaments 360, thickness 167 tex, elongation 11.8%, tensile strength 0.77 N/tex) were uni-directionally aligned and laid out in the form of a sheet. The pitch between the polyester fibre bundles at this time was made 10 mm. Hybrid prepreg E (prepreg weight per unit area 314 $g/m^2$, fibre content 68 wt %) was prepared by impregnating this with B-stage epoxy resin. The percentage by volume of the polyester fibre in terms of the carbon fibre in this hybrid prepreg E was 10%.

A shaft for a ski pole was produced in the same way as in Example 1 except that there was used hybrid prepreg E instead of hybrid prepreg B.

When the end faces of this shaft were polished and observed with an optical microscope, it was seen that the hybrid region on the shaft exterior where the fibre direction was parallel to the principal axis had a sea/islands structure in which regions having polyester fibre were dispersed in the region having carbon fibre. The wall thickness of the shaft was 1.5 mm.

When this shaft was subjected to a buckling point test based on JIS S7026, the maximum load was 660 N. There was no scattering of fragments at the time of failure and there was no breaking apart of the shaft.

EXAMPLE 5

Covered yarn comprising a PAN based carbon fibre bundle identical to that used in Example 1 covered in helical fashion with a nylon 66 fibre bundle was aligned and laid out in the form of a sheet. Hybrid prepreg F (prepreg weight per unit area 300 $g/m^2$, fibre content 67 wt %) was prepared by impregnating this with B-stage epoxy resin. The percentage by volume of the nylon in terms of the carbon fibre in this covered yarn prepreg F was 15%.

A shaft for a ski pole was produced in the same way as in Example 1 except that there was used covered yarn prepreg F instead of hybrid prepreg B.

When the end faces of this shaft were polished and observed with an optical microscope, it was seen that the region on the shaft exterior where the carbon fibre direction was parallel to the principal axis had a structure with 50% of the circumference of each carbon fibre bundle covered with a nylon 66 bundle. The wall thickness of the shaft was 1.5 mm.

When this shaft was subjected to a buckling point test based on JIS S7026, the maximum load was 670 N. There was no scattering of broken fragments at the time of failure and there was no breaking apart of the shaft.

COMPARATIVE EXAMPLE 1

A shaft for a ski pole was produced in the same way as in Example 1 except that carbon fibre prepreg A was used instead of the hybrid prepreg B.

At the end face of this shaft, the shaft wall thickness was 1.5 mm.

When this shaft was subjected to a buckling point test based on JIS S7026, the maximum load was 690 N. Broken fragments were scattered at the time of failure, there was breaking apart of the shaft and, furthermore, the fracture surface had a finely split state, so dangerous failure was exhibited.

COMPARATIVE EXAMPLE 2

Nylon 66 fibre bundles identical to those used in Example 1 were aligned and laid out in the form of a sheet. Nylon prepreg G (prepreg weight per unit area 239 $g/m^2$, fibre content 58 wt %) was prepared by impregnating this with B-stage epoxy resin.

A shaft for a ski pole was produced in the same way as in Example 1 except that nylon prepreg G was used instead of the hybrid prepreg B.

At the end face of this shaft, the shaft wall thickness was 1.5 mm.

When this shaft was subjected to a buckling point test based on JIS S7026, the maximum load was 35 N. There was no scattering of broken fragments at the time of failure and there was no breaking apart of the shaft.

EXAMPLE 6

PAN-based carbon fibre bundles identical to those used in Example 1 were aligned and laid out in the form of a sheet, which was impregnated with B-stage epoxy resin to prepare carbon fibre prepreg H (prepreg weight per unit area 88 $g/m^2$, fibre content 63 wt %).

Identical PAN-based carbon fibre bundles and nylon 66 fibre bundles identical to those used in Example 1 were uni-directionally aligned and laid out in the form of a sheet. The pitch between the nylon 66 fibre bundles at this time was made 10 mm. Hybrid prepreg I (prepreg weight per unit area 261 $g/m^2$, fibre content 70 wt %) was prepared by impregnating this with B-stage epoxy resin. The percentage by volume of the nylon 66 in terms of the carbon fibre in this hybrid prepreg I was 21%.

E-glass fibre bundles (number of filaments 2000, thickness 110 tex, elongation 4%, tensile strength 2500 MPa, and tensile modulus 75 GPa) were formed into a cloth form in plain-weave fashion (GF yarn count; warp yarns=39 per inch and weft yarns=39 per inch) and laid out in the form of a sheet, which was impregnated with B-stage epoxy resin to prepare a glass cloth prepreg J (prepreg weight per unit area 133 $g/m^2$, fibre content 52 wt %).

Firstly, the carbon fibre prepreg H was wound around a release agent-treated stainless steel mandrel of outer diameter 5 mm on the narrower diameter side and 13 mm on the wider diameter side, and of length 1400 mm, in such a way that the fibre direction was at an angle of about ±45° to the principal axis of the mandrel, then the hybrid prepreg I was wound around in such a way that fibre direction was roughly parallel to the principal axis of the mandrel, after which, glass cloth prepreg J was wrapped around. Next, by the method normally conducted by those skilled in the art, wrapping tape was wound around and curing carried out in an electric oven, after which the mandrel was removed, the outer diameter polished and the two ends cut off, to produce a shaft for a ski pole of length 1120 mm.

When the end faces of this shaft were polished and observed with an optical microscope, it was seen that the hybrid region on the shaft exterior where the fibre direction was parallel to the principal axis had a sea/islands structure in which the regions having nylon 66 were dispersed in the region having carbon fibre. The wall thickness of the shaft was 1.5 mm.

When this shaft was subjected to a buckling point test based on JIS S7026, the maximum load was 640 N. There was no scattering of broken fragments at the time of failure and there was no breaking apart of the shaft.

EXAMPLE 7

PAN-based carbon fibre bundles and nylon 66 fibre bundles identical to those used in Example 1 were uni-directionally aligned and laid out in the form of a sheet. The pitch between the nylon 66 fibre bundles at this time was made 7.5 mm. Hybrid prepreg K (prepreg weight per unit area 214 g/m$^2$, fibre content 63 wt %) was prepared by impregnating this with B-stage epoxy resin. The percentage by volume of the nylon 66 fibre in terms of the carbon fibre in this hybrid prepreg K was 41%.

A shaft for a ski pole was produced in the same way as in Example 6 except that there was used hybrid prepreg K instead of hybrid prepreg I.

When the end faces of this shaft were polished and observed with an optical microscope, it was seen that the hybrid region on the shaft exterior where the fibre direction was parallel to the principal axis had a sea/islands structure in which regions having nylon 66 fibre were dispersed in the region having carbon fibre. The wall thickness of the shaft was 1.5 mm.

When this shaft was subjected to a buckling point test based on JIS S7026, the maximum load was 510 N. There was no scattering of broken fragments at the time of failure and there was no breaking apart of the shaft.

COMPARATIVE EXAMPLE 3

PAN-based carbon fibre bundles identical to those used in Example 1 were uni-directionally aligned and laid out in the form of a sheet, which was impregnated with B-stage epoxy resin to prepare carbon fibre prepreg L (prepreg weight per unit area 261 g/m$^2$, fibre content 67 wt %).

A shaft for a ski pole was produced in the same way as in Example 6 except that there was used carbon fibre prepreg L instead of hybrid prepreg I. The wall thickness of the shaft was 1.5 mm.

When this shaft was subjected to a buckling point test based on JIS S7026, the maximum load was 660 N. Broken fragments were scattered at the time of failure, there was breaking apart of the shaft and, furthermore, the fracture surface had a finely split state, so dangerous failure was exhibited.

EXAMPLE 8

PAN-based carbon fibre bundles and nylon 66 fibre bundles identical to those used in Example 1 were uni-directionally aligned and laid out in the form of a sheet. The pitch between the nylon 66 fibre bundles at this time was made 14.5 mm. Hybrid prepreg M (prepreg weight per unit area 187 g/m$^2$, fibre content 68 wt %) was prepared by impregnating this with B-stage epoxy resin. The percentage by volume of the nylon 66 fibre in terms of the carbon fibre in this hybrid prepreg K was 21%.

PAN-based carbon fibre bundles (number of filaments 6000, thickness 225 tex, elongation 1.2%, tensile strength 4410 MPa and tensile elastic modulus 375 GPa) were aligned and laid out in the form of a sheet, which was impregnated with B-stage epoxy resin to prepare carbon fibre prepreg N (prepreg weight per unit area 174 g/m$^2$, fibre content 67 wt %).

Firstly, the carbon fibre prepreg N was wound around a release agent-treated stainless steel mandrel of outer diameter 5.4 mm on the narrower diameter side and 14 mm on the wider diameter side, and of length 1400 mm, in such a way that the fibre direction was at an angle of about ±45° to the principal axis of the mandrel, then the hybrid prepreg M was wound around in such a way that fibre direction was roughly parallel to the principal axis of the mandrel, after which hybrid prepreg M was wound around as a tip reinforcement on the narrower diameter side. Next, by the method normally conducted by those skilled in the art, wrapping tape was wound around and curing carried out in an electric oven, after which the mandrel was removed, the outer diameter polished and the two ends cut off, to produce a shaft for a golf club of length 1143 mm.

When the end faces of this shaft were polished and observed with an optical microscope, it was seen that the hybrid region on the shaft exterior where the fibre direction was parallel to the principal axis had a sea/islands structure in which the regions having nylon 66 were dispersed in the region having carbon fibre. The wall thickness of the shaft in the region without the tip reinforcement was 0.8 mm.

When this shaft was subjected to a three-point bending test at a span of 600 mm, the maximum load was 340 N. There was no scattering of broken fragments at the time of failure and there was no breaking apart of the shaft.

COMPARATIVE EXAMPLE 4

PAN-based carbon fibre bundles identical to those used in Example 1 were uni-directionally aligned and laid out in the form of a sheet, which was impregnated with B-stage epoxy resin to prepare carbon fibre prepreg O (prepreg weight per unit area 187 g/m$^2$, fibre content 67 wt %).

A shaft for a golf club was produced in the same way as in Example 8 except that there was used carbon fibre prepreg O instead of hybrid prepreg M. The wall thickness of the shaft in the region without the tip reinforcement was 0.8 mm.

When this shaft was subjected to a three-point bending test at a span of 600 mm, the maximum load was 350 N. At the time of failure there was breaking apart of the shaft and scattering of fragments.

Industrial Applicability

Fiber reinforced plastic members of the present invention either have hybrid regions having both carbon fibre and high-elongation organic fibre, or have aligned carbon fibre bundles with high-elongation organic fibre covering them, and so, while maintaining the outstanding characteristics of carbon fibre reinforced plastics of light weight and high strength, they do not readily split apart at the time of failure or exhibit a dangerous failure mode, so it is possible to offer highly safe members at low cost.

The members of the present invention can be suitably used as ski poles, bicycle frames, golf club shafts, badminton racket shafts, wheelchair frames or hockey sticks, etc.

TABLE 1

| | Nylon Fibre[1] | | Pregreg | | Shaft Internal Diameter/ | Maximum | |
| | Percent by Volume | Pitch (mm) | Weight per Unit Area (g/m$^2$) | Weight Percent of Fibre | Wall Thickness (mm/mm) | Load (N) | Safety at time of Failure |
|---|---|---|---|---|---|---|---|
| Example 1 | 5 | 30 | 315 | 68 | 11/1.5 | 690 | did not break apart but scatter of small fragments |
| Example 2 | 10 | 15 | 311 | 68 | 11/1.5 | 688 | did not break apart, no scatter of fragments |
| Example 3 | 29 | 5 | 296 | 66 | 11/1.5 | 620 | did not break apart, no scatter of fragments |
| Example 4 | 10 | 10 | 314 | 68 | 11/1.5 | 660 | did not break apart, no scatter of fragments |
| Example 5 | 15 | helical covering | 300 | 67 | 11/1.5 | 670 | did not break apart, no scatter of fragments |
| Example 6 | 21 | 10 | 261 | 70 | 13/1.5 layered with different prepreg | 640 | did not break apart, no scatter of fragments |
| Example 7 | 41 | 7.5 | 214 | 63 | 13/1.5 layered with different prepreg | 510 | did not break apart, no scatter of fragments |
| Example 8 | 21 | 14.5 | 187 | 68 | 14/0.8 layered with different prepreg | 340 | did not break apart, no scatter of fragments |
| Comp. Ex. 1 | — | — | 320 | 67 | 11/1.5 | 690 | breaks apart, scatter of fragments dangerous fracture surface |
| Comp. Ex. 2 | ∞ | 0 | 239 | 58 | 11/1.5 | 35 | did not break apart, no scatter of fragments |
| Comp. Ex. 3 | — | — | 261 | 67 | 13/0.5 layered with different prepreg | 660 | breaks apart, scatter of fragments dangerous fracture surface |
| Comp. Ex. 4 | — | — | 187 | 67 | 14/0.8 layered with different prepreg | 350 350 | breaks apart, scatter of fragments |

Note:
[1] Number of filaments = 306, thickness 210 tex; except in Example 4 where polyester fibre bundles used, number of filaments = 360, thickness 167 tex

What is claimed is:

1. A hybrid tubular shaped fibre reinforced plastic member which is characterized in that said member has carbon fibre and high-elongation organic fibre having an elongation at break thereof exceeding about 10%, said high-elongation fibre being contained in the tubular shape of the reinforced plastic member, said carbon fibre and high-elongation fibre, being uni-directionally aligned, and wherein high-elongation organic fibre bundle regions are present separately within the tubular shaped plastic member, and arranged at a pitch, said pitch being no more than 50 mm at right angles to a carbon fibre axis.

2. A hybrid tubular shaped fibre reinforced plastic member according to claim 1 which is characterized in that the thickness of the high-elongation organic fibre bundle is from 40 to 300 tex.

3. A hybrid tubular shaped fibre reinforced plastic member according to claim 1 which is characterized in that the thickness of the high-elongation organic fibre bundle is from 180 to 300 tex.

4. A hybrid tubular shaped fibre reinforced plastic member according to claim 1 which is characterized in that the high-elongation organic fibre is a polyamide fibre.

5. A hybrid tubular shaped fibre reinforced plastic member according to claim 1 which is characterized in that the proportion by volume of the high-elongation organic fibre in terms of the carbon fibre is from 10 to 30%.

6. A hybrid tubular shaped fibre reinforced plastic member according to claim 1 which is characterized in that the alignment direction of the carbon fibre and the high-elongation organic fibre is parallel to the principal axis of the tubular shaped fibre reinforced plastic member.

7. A hybrid tubular shaped fibre reinforced plastic member according to claim 1 which is characterized in that elongation at break of the high-elongation organic fibre is 15–50%.

8. A hybrid tubular shaped fibre reinforced plastic member according to claim 1 which is characterized in that high-elongation organic fibre covers a carbon fibre bundle.

9. A ski pole having a hybrid fibre reinforced plastic member according to claim 1.

10. A shaft for a golf club having a hybrid fibre reinforced plastic member according to claim 1.

11. A hybrid prepreg which is characterized in that carbon fibre and high-elongation organic fibre are impregnated with a resin, said high-elongation fibre having an elongation at break thereof exceeding about 10%, said carbon fibre and high-elongation fibre, being uni-directionally aligned, and wherein high-elongation fibre bundle regions are present separately within the prepreg, and arranged at a pitch, said pitch being no more than 50 mm at right angles to a carbon fibre axis.

12. A hybrid prepreg according to claim 11 which is characterized in that the proportion by volume of the high-elongation organic fibre in terms of the carbon fibre is 10–50%.

13. A method of producing a hybrid tubular shaped fibre reinforced plastic member which is characterized in that fabrication is carried out using hybrid prepreg according to claim 11.

14. A hybrid tubular shaped fibre reinforced plastic member according to claim 1 which is characterized in that the high-elongation organic fibre is treated with a release agent.

15. A hybrid tubular shaped fibre reinforced plastic member according to claim 1 which is characterized in that the high elongation organic fibre bundles are incorporated in a non-adhered state.

* * * * *